United States Patent [19]

Byron

[11] Patent Number: 5,195,160
[45] Date of Patent: Mar. 16, 1993

[54] AMPLIFIED OPTICAL FIBRE SYSTEMS

[75] Inventor: Kevin C. Byron, Bishop's Stortford, United Kingdom

[73] Assignee: Northern Telecom Limited, Montreal, Canada

[21] Appl. No.: 783,881

[22] Filed: Oct. 29, 1991

[30] Foreign Application Priority Data

Nov. 9, 1990 [GB] United Kingdom ............... 9024392

[51] Int. Cl.$^5$ .............................................. G02B 6/18
[52] U.S. Cl. .................................. 385/123; 385/124; 372/6
[58] Field of Search .............. 385/123, 126, 127, 128; 372/6

[56]  References Cited
U.S. PATENT DOCUMENTS

| 4,923,279 | 5/1990 | Ainslie et al. ............... 385/142 |
| 5,035,481 | 7/1991 | Mollenauer ................. 385/24 |
| 5,048,026 | 9/1991 | Shaw et al. ................. 385/15 |
| 5,058,974 | 10/1991 | Mollenauer ................. 385/24 |
| 5,058,976 | 10/1991 | DiGiovanni et al. .......... 385/15 |

FOREIGN PATENT DOCUMENTS 0248517 12/1987 European Pat. Off. .
8802133 3/1988 PCT Int'l Appl. .
2169765 7/1986 United Kingdom .
2180392 3/1987 United Kingdom .
2228362 8/1990 United Kingdom .

Primary Examiner—John D. Lee
Assistant Examiner—Stephen W. Barns
Attorney, Agent, or Firm—Lee, Mann, Smith, McWilliams, Sweeney & Ohlson

[57] ABSTRACT

In order to achieve increased spacing between amplifiers in soliton transmission systems, it is proposed to use distributed amplifiers, whereby the fibre is a continuous amplifier, rather than or in addition to the conventional lumped amplifiers. This is achieved by using rare earth, for example, erbium doped fibre as the or part of the transmission fibre (4; 4, 7) for the solitons and arranging that the erbium doped fibre appears substantially lossless to input soliton pulses. The latter can be achieved by varying the erbium concentration along the fibre length and providing appropriate optical pumping (5) for the erbium doped fibre. Alternatively, the output of the pump (5) for the fibre can itself be pumped (5a) whereby to replenish the pump power lost to the erbium doped fibre.

8 Claims, 1 Drawing Sheet

AMPLIFIED OPTICAL FIBRE SYSTEMS

BACKGROUND OF THE INVENTION

This invention relates to amplified optical fibre systems and in particular to amplified long haul telecommunications systems especially soliton systems.

In an ideal soliton system, a pulse propagates down a fibre and suffers no dispersion since there is a dynamic balance between the new frequency components developed by self-phase modulation and the negative group velocity dispersion. The negative dispersion causes the newly generated high frequency components to speed up relative to the lower frequency components thereby causing the pulse to retain its shape. Unfortunately, "ideal" conditions require that the transmission line (fibre) is lossless i.e. zero attenuation. Since the losses in a fibre are finite, some form of optical amplification is required to overcome the losses. With optical amplifiers it is possible to boost a pulse, which has reached the point where it is losing its soliton characteristics, back to being a soliton again. The choices of amplifiers are semiconductor laser, erbium fibre and Raman fibre amplifier. The most common currently being the semiconductor laser and erbium fibre. Both of these amplifiers are "lumped" amplifiers, that is to say they are discrete devices (a diode amplifier or ten metres of erbium fibre) spliced into the transmission fibre at regular intervals. Thus, although the fibre loss affecting a transmitted pulse can be offset by the gain of the amplifier, the transmission line cannot be described as lossless since zero loss only occurs at one point in an amplifier span.

The problem for soliton pulses in such systems is that the peak power will vary down the length of the fibre. If the peak power exceeds a value of 9P/4 where P is the optimum power for the lowest (first) order soliton, then a higher order soliton will be produced which is unsuitable for data transmission since it contains multiple peaks and changes shape as it travels down the fibre. On the other hand if the peak power in the soliton falls below P/4, the conditions for soliton transmission are violated and the pulse will simply spread out due to dispersion and the soliton is lost. Thus the distance between the amplifiers in a soliton system is going to be determined by these power limits (9P/4 to P/4) and for very long haul high bit-rate systems the amplifier spacing was thought to be restricted by the Gordon-Haus effect to about 25 to 30 Km, for shorter haul systems of say a few hundred kilometers wider amplifier spacings of 50 or more Km may be obtainable. This is actually worse than conventional non-soliton system repeater spacings, although the optical amplifier approach is such that, if it can be done at 25 Km spacings, then it can be done at 25 Km spacings for thousands of kilometres, which is not possible with ordinary intensity modulation. These spacings may need to be reviewed since there is a current thought that the Gordon-Haus effect may be avoidable using filters. The Gordon-Haus effect is a phenomenon in which non-linear mixing between the signal and amplified spontaneous emission in a long multi-amplifier soliton system causes random frequency shifts in the pulses, thereby producing delay shifts eventually leading to inter-symbol interference. Gordon and Haus derived an expression which defines the limits for spacing of amplifiers and the overall system length before these effects cause signal impairment.

We currently consider that it will not be possible to achieve wider amplifier spacings, say 80 to 100 Km, with lumped amplifiers even if the latter could be improved. The main reason for this is that the soliton power has to lie between P/4 and 9P/4 for a first order soliton and whilst the pulse may spread out, provided its power does not fall below P/4 it can be boosted back to being a first order soliton again, although the power to which it is boosted must then not exceed 9P/4. Hence the repeater spacing for lumped amplifiers is determined by how much the power drops before the soliton is lost.

The above discussion is concerned with the soliton propagation regime in which the soliton period $Z_o$ is small compared with the amplifier spacing and the power is kept within the limits mentioned.

$$Z_o = \frac{\pi C}{\lambda^2} \frac{T^2}{D}$$

where T is the pulse width, $\lambda$ is the wavelength and D is the fibre dispersion.

Soliton systems are designed for use at 1.55 $\mu$m and with conventional fibres having a zero dispersion wavelength $\lambda_o$ of 1.3 $\mu$m, the dispersion at 1.55 $\mu$m is sufficiently large that the soliton period is typically a few kilometers.

There is, however, now another soliton propagation regime i.e. one which uses dispersion shifted fibre, in which case the soliton period is at least an order of magnitude longer because the dispersion is smaller. A dispersion shifted fibre is a single mode fibre in which the wavelength of zero dispersion has been shifted out of the 1.5 $\mu$m low loss window. This is achieved by having a higher delta n and/or smaller core size than conventional (1.3 $\mu$m) fibre. Given that typical spacings between amplifiers is 30 Km, this other regime is one in which the soliton period is much longer than the amplifier spacing. It has been demonstrated that in this regime the soliton power can be much larger than the 9P/4 level refered to above. Indeed this other regime, known as the average soliton regime, as long as the average power over one amplifier period is equal to the N=1 soliton power, the soliton propagates stably. In other words, the soliton is insensitive to perturbations in power or fibre dispersion, provided the average soliton power rule is not violated.

The present invention aims to provide means whereby wider amplifier spacings than hitherto can be achieved.

SUMMARY OF THE INVENTION

According to the present invention there is provided an optical fibre telecommunications system comprising a rare earth doped optical fibre capable of transmitting soliton pulses and optical pumping means for the doped fibre, the fibre comprising a distributed amplifier for the soliton pulses, and wherein the system is such that the fibre appears substantially lossless to an input soliton pulse.

BRIEF DESCRIPTION OF THE DRAWINGS

Embodiments of the invention will now be described with reference to the accompanying drawings in which.

SPECIFIC DESCRIPTION OF THE PREFERRED EMBODIMENTS

As discussed above, lumped amplifiers involve a fundamental limit to the repeater spacing associated with them. The present invention, however, proposes the use of distributed amplifiers where the fibre is also a continuous amplifier and much longer repeater spacings can be realised. The present application basically achieves this by means of special fibre design. Without such special arrangements the distributed amplifier would offer little advantage over the lumped amplifier, since zero loss for the signal would still only by achieved at discrete points down the fibre.

The present invention proposes that the optical fibre is itself erbium doped optical fibre and therefore capable of providing its own gain, thus very long lengths of erbium doped fibre are envisaged rather than the short, e.g. 15 metre, lengths used for lumped amplifiers.

The following equation indicates how signal power $P_s$ varies along a length $p$ of erbium doped fibre of gain constant $g$, loss $a$, spot size (area) A for a pump power P, $P_o$ being the signal power at zero length.

$$P_s = P_o \exp\left( \frac{ge^{-al} \cdot L_R}{A} - al \right) \quad (1)$$

$L_R$, the effective length, $= 1 - \frac{e^{-al}}{a}$

Figure 1:
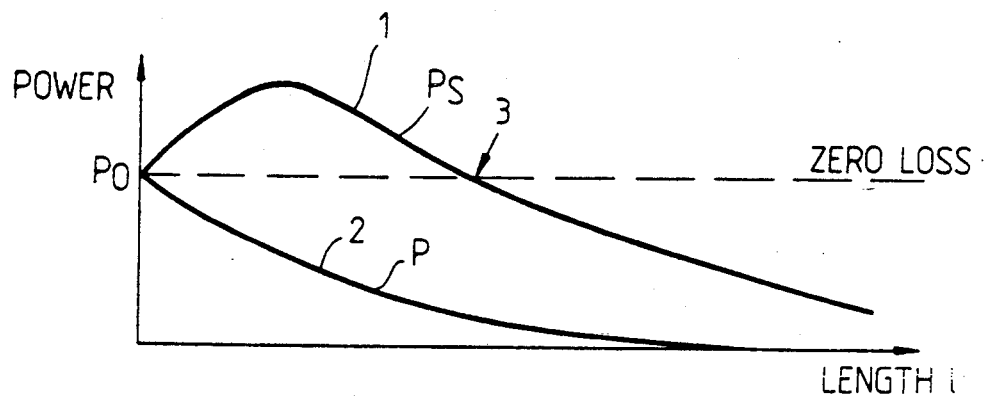
FIG. 1 illustrates variation in signal strength along the length of an erbium doped optical fibre.

If $P_s$ is plotted against length $p$ for a long length of erbium fibre, curve 1 of FIG. 1 of the drawings is obtained. Curve 2 indicates the pump power P depletion. Initially $P_s$ is amplified by the pump and then it begins to decay. Initially the first term in the brackets of equation (1) dominates but subsequently the second term $ap$ dominates. This arrangement is lossless only at zero length and at point 3. There are, however, a number of possibilities whereby the erbium doped fibre can be made to appear lossless, i.e. maintain $P_s$ nominally constant, over a length thereof rather than at discrete points, and by so doing the repeater spacing can be increased.

Consideration of equation (1) reveals that in theory this could be achieved by removing the fibre loss, i.e. having zero loss, but this is not possible. Alternatively, the spot size A could be varied along the fibre length, or any other variation which would delay the time at which the second term $ap$ begins to dominate could be used. In view of the lengths involved area variation is not practicable. Now, the pump power P itself falls off exponentially. If the absorbed pump power could be replenished along the length of the fibre, i.e. $Pe^{-ap}$ is kept constant, then you can get constant gain and $P_s$ could be maintained constant i.e. the curve 1 would be flattened. Normally the pump power decreases as indicated by curve 2. If however power were to be supplied to the erbium fibre's pump to replenish it continuously then the $P_s$ curve 1 could be flattened. This can be achieved by Raman amplification, in the erbium fibre, in which the erbium fibre's pump is amplified by another laser pump which was at such a wavelength that the erbium fibre's pump was one Stokes shift away. Thus an erbium fibre's pump at 1480 nm would itself be pumped via Raman amplification in the erbium fibre by another laser emitting in the region of 1400 nm, but ideally away from the water peak. This would be the case for a soliton signal $P_s$ at 1.53 or 1.55 microns. This pumping the pump solution for a distributed amplifier (erbium fibre) is a practical solution to the problem.

Figure 2A:
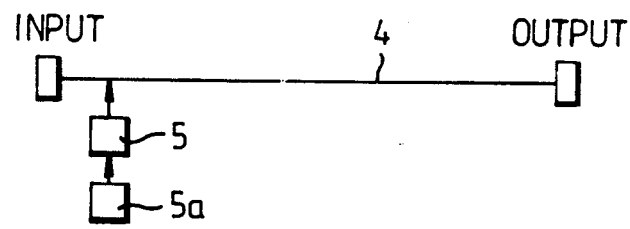
FIGS. 2a and 2b illustrate two possible lossless amplifier configurations.

Another practical solution is to vary the gain along the length of the erbium fibre. Since this is a function of erbium concentration, variation of the gain can be achieved by variation of the erbium concentration along the fibre length. This can be achieved in the CVD process by altering the flow rate of dopant gases as a function of the position of the burner. The least gain would be required at the signal input end so that the lowest erbium concentration would be required there and there will also be the lowest power absorption of the pump there. As the signal progresses along the fibre the loss will begin to take effect, hence the gain in the amplifier will have to be increased, i.e. the erbium concentration will need to rise, to overcome this. In such a fibre system, therefore, the gain at the input end would be lower than at the output end and thus the lower pump power available at the output end, due to depletion along the fibre length, will result in a higher gain. The signal evolution in such a system will tend towards the ideal for lossless transmission. Variants on this system would be reverse pumping in which the lowest erbium concentration would be at the output end of the fibre, and dual pumping in which two fibres are spliced together with the high concentration ends at the splice. Fig. 2a illustrates one lossless amplifier configuration schematically. The lossless amplifier fibre 4 is disposed between two terminals labelled INPUT and OUTPUT. A pump 5 is indicated near the INPUT in this instance. A pump for pumping the pump is indicated at 5a.

It is considered that by using erbium doped fibre as the transmission medium and any of the above methods of causing the erbium doped fibre to appear lossless to input solition pulses, the distance between repeaters/amplifiers in a soliton system can be greatly increased over the current limits of the order of 30 Km and probably to distances of the order of 60 or more Km.

Instead of erbium other rare earth dopants could be used, for example, neodymium.

Figure 2B:
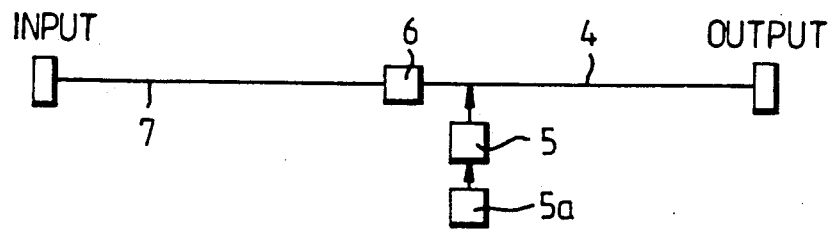

The above discussion of the invention is in terms of the first mentioned soliton propagation regime i.e. where the soliton period is small compared with the amplifier spacing. The average soliton regime at first sight appears to make the idea of a lossless line (fibre) redundant, since one is no longer worried about the exponential decrease in power as the pulse is transmitted. However the lossless line idea is believed also to be of use with the average soliton regime. Consider a system that has been designed to have a spacing between amplifiers based on the average soliton principle. According to the ideas discussed above, this length (amplifier spacing) could be increased by the addition of a lossless line, since the average power at the end of the lossless line would be the same as that without it. Hence provided the Gordon-Haus effect is not a limiting factor, for a given soliton system design using either regime, the spacing can always be increased by using a lossless amplifier instead of a lumped amplifier because the lossless amplifier gives constant power along its length. The lossless amplifier is simply added at the end (or the beginning) in order to give an extra span length. FIG. 2b illustrates one possible configuration schematically. A conventional transmission fibre 7 is disposed between an INPUT terminal and a lumped amplifier 6. The lossless amplifier fibre 4 is disposed between amplifier 6 and an OUTPUT terminal. A pump 5 for fibre 4 is illustrated near amplifier 6. A pump for pumping the pump is indicated at 5a.

I claim:

1. An optical fibre telecommunications system comprising a rare earth doped optical fibre capable of transmitting soliton pulses and optical pumping means for the doped fibre, the fibre comprising a distributed amplifier for the soliton pulses, and wherein the concentration of the rare earth is graded along the fibre length and the optical pumping means is arranged to provide pumping appropriate to the grading variations whereby the fibre appears substantially lossless to an input soliton pulse.

2. An optical fibre system as claimed in claim 1 wherein the rare earth dopant is erbium.

3. An optical fibre system as claimed in claim 1 further comprising a first transmission system including a transmission fibre and a lumped optical amplifier therefor, the rare earth doped fibre constituting a lossless amplifier added to the first transmission system and serving to extend the span length.

4. An optical fibre system as claimed in claim 3 wherein the transmission fibre is dispersion shifted fibre.

5. An optical fibre telecommunications system comprising a rare earth doped optical fibre capable of transmitting soliton pulses and optical pumping means for the doped fibre, the fibre comprising a distributed amplifier for the soliton pulses, and wherein the output of the optical pumping means is itself pumped by a second optical pump whereby to replenish the pump power lost to the rare earth doped fibre along the length thereof whereby the fibre appears substantially lossless to an input soliton pulse.

6. An optical fibre system as claimed in claim 5 wherein the rare dopant is erbium.

7. An optical fibre system as claimed in claim 5 further comprising a first transmission system including a transmission fibre and a lumped optical amplifier therefor, the rare earth doped fibre constituting a lossless amplifier added to the first transmission system and serving to extend the span length.

8. An optical fibre system as claimed in claim 7 wherein the transmission fibre is dispersion shifted fibre.

* * * * *